Sept. 21, 1965 E. G. STROMER 3,208,000
STABILIZED AMPLIFIERS
Filed Feb. 28, 1963
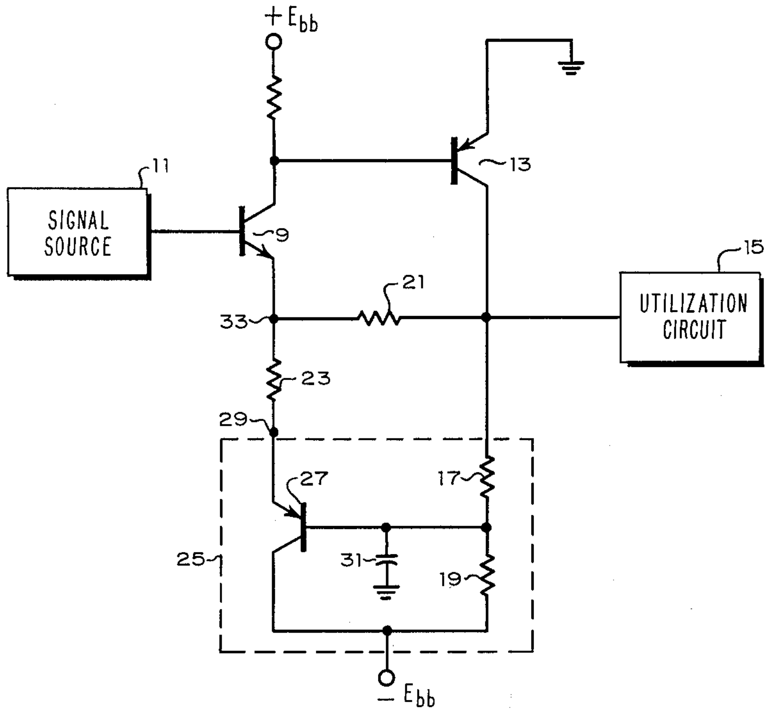
INVENTOR
EDGAR G. STROMER
BY Albert C. Smith
AGENT

United States Patent Office 3,208,000
Patented Sept. 21, 1965

3,208,000

STABILIZED AMPLIFIERS

Edgar G. Stromer, Palo Alto, Calif., assignor to Hewlett-Packard Company, Palo Alto, Calif., a corporation of California Filed Feb. 28, 1963, Ser. No. 261,667
2 Claims. (Cl. 330—25)

This invention relates to a compensating network for an amplifier circuit which minimizes output drift and improves low frequency response.

Certain wide-band transistor amplifiers use passive networks in a feedback path to increase the feedback at low frequencies and thereby improve the stability of the circuit. Active networks in the feedback path become more desirable where a high degree of freedom from drift is required and where the low frequency response desired requires a very large capacitance in a passive network. Drift stability is particularly important in high frequency wide-band amplifiers where transistors provide optimum performance at a selected operating point.

Accordingly, it is an object of the present invention to provide a compensating network which uses an active element and which improves the stability and low frequency response of a wide-band amplifier.

It is another object of the present invention to provide an improved wide-band amplifier circuit.

Other and incidental objects of the present invention will be apparent from a reading of this specification and an inspection of the accompanying drawing which shows a schematic diagram of the circuit of the present invention.

Referring to the drawing there is shown a transistor 9 connected to receive the signal from signal source 11 and to apply the amplified signal appearing on its collector electrode to the base electrode of transistor 13. The output of transistor 13 is connected to the utilization circuit 15 and to a high impedance divider network including resistor 17 and resistor 19. A feedback circuit including resistors 21 and 23 is connected to apply a portion of the signal at the output of transistor 13 to the emitter electrode of transistor 9. The compensation network 25 includes transistor 27 connected in the common collector configuration with the emitter electrode connected to terminal 29 of resistor 23. The common terminal of the resistors 17 and 19 is connected to the input of transistor 27 and to capacitor 31. The gain of the circuit at mid-band is determined substantially by the division ratio provided by resistors 21 and 23 if it is assumed that the open loop gain of transistors 9 and 13 is large and that the impedance seen at terminal 29 is small. Changes in the current in transistor 13 due, for example, to the changes in emitter-base junction voltage with temperature cause drift in the output. Drift signals from the output are normally reduced by the division ratio of resistors 21 and 23 before being fed back to the input of transistor 9 for correction. This results in low D.C. feedback from the output of transistor 13 to the input of transistor 9. This D.C. feedback and hence the drift stability is improved by the compensating network 25. The change in current in transistor 13 produces a signal at the common terminal of resistors 17 and 19 which is applied through the common collector stage 27 to the terminal 29 of resistor 23. Thus, the drift-compensating signal fed back to the input of transistor 9 through the compensating network 25 is much larger than the drift-compensating signal which is normally applied through resistors 21 and 23 alone. This provides increased D.C. feedback and hence increased drift stability with a resulting decrease in overall gain.

Gain degeneration at low frequencies is minimized by the combination of capacitor 31 and transistor 27 connected to terminal 29. The effective capacitance of this capacitor at a given low frequency as seen at terminal 29 is multiplied by a current gain parameter $\beta$ of transistor 27. The effect upon gain degeneration of a small capacitor 31 is thus greatly improved by the use of active element 27 in the compensating network 25. Also, by connecting capacitor 31 to ground rather than to the collector of transistor 27 the ripple appearing on the negative supply voltage $E_{bb}$ is reduced.

Therefore the present invention improves low frequency response of a multi-stage feedback amplifier and improves its drift stability using only a minimum of circuit elements and an active element arranged in a compensating network.

I claim:

1. A signal circuit comprising:
a first amplifier having an input connected to receive an applied signal and having another input and an output;
second and third amplifiers, each having an input and an output;
means connecting the input of the second amplifier to the output of the first amplifier;
a low pass filter;
a first negative feedback path including said filter and the third amplifier connected to the output of the second amplifier;
a frequency-insensitive signal conducting circuit connected to the output of the second amplifier for providing a second separate negative feedback path;
means connected to said other input of the first amplifier for applying thereto the combination of signals from the first and second negative feedback paths; and
a utilization circuit connected to the output of said second amplifier.

2. A signal circuit as in claim 1 wherein the first feedback path provides greater D.C. signal transmission than the second feedback path and the second feedback path provides greater signal transmission than the first feedback path for signal frequencies above a selected value.

References Cited by the Examiner

UNITED STATES PATENTS

| | | | |
|---|---|---|---|
| 2,261,335 | 11/41 | Braden | 330—90 X |
| 2,793,256 | 5/57 | Taieb | 330—103 X |
| 2,886,659 | 5/59 | Schroeder | 330—85 |
| 2,979,666 | 4/61 | Erath | 330—25 X |
| 3,025,472 | 3/62 | Greatbatch | 330—25 X |
| 3,131,258 | 4/64 | O'Neill | 330—25 X |

OTHER REFERENCES

Article by Edward J. Nossen in the RCA Technical Notes cited as RCA TN No. 266, June 1959, one page.

ROY LAKE, *Primary Examiner.*

NATHAN KAUFMAN, *Examiner.*